(12) United States Patent
Peterson et al.

(10) Patent No.: US 11,269,893 B2
(45) Date of Patent: Mar. 8, 2022

(54) QUERY-ANSWERING SOURCE FOR A USER QUERY

(71) Applicant: Lenovo (Singapore) Pte. Ltd., Singapore (SG)

(72) Inventors: Nathan J. Peterson, Oxford, NC (US); Russell Speight VanBlon, Raleigh, NC (US); John Carl Mese, Cary, NC (US); Mark Patrick Delaney, Raleigh, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 191 days.

(21) Appl. No.: 16/131,619

(22) Filed: Sep. 14, 2018

(65) Prior Publication Data
US 2020/0089780 A1 Mar. 19, 2020

(51) Int. Cl.
*G06F 16/2457* (2019.01)
*G06F 16/2455* (2019.01)

(52) U.S. Cl.
CPC .... *G06F 16/24578* (2019.01); *G06F 16/2455* (2019.01)

(58) Field of Classification Search
CPC .............. G06F 16/24578; G06F 16/2455
See application file for complete search history.

(56) References Cited

U.S. PATENT DOCUMENTS

| | | | | |
|---|---|---|---|---|
| 5,862,223 A | * | 1/1999 | Walker | G06Q 20/383 705/50 |
| 8,595,228 B1 | * | 11/2013 | Horling | G06F 16/90324 707/733 |
| 9,424,354 B2 | * | 8/2016 | Teevan | G06F 16/38 |
| 9,461,958 B1 | * | 10/2016 | Green | H04N 21/4756 |
| 9,805,373 B1 | * | 10/2017 | Epelman-Wang | G06Q 10/101 |
| 10,019,988 B1 | * | 7/2018 | Chan | G06F 16/683 |
| 10,599,644 B2 | * | 3/2020 | Braz | G06F 16/3329 |
| 2009/0292680 A1 | * | 11/2009 | Sabnani | G06F 40/134 |
| 2009/0307196 A1 | * | 12/2009 | Shuster | H04L 67/22 |
| 2011/0010367 A1 | * | 1/2011 | Jockish | G06F 16/334 707/733 |
| 2012/0005218 A1 | * | 1/2012 | Rajagopal | G06F 16/24578 707/749 |
| 2012/0005219 A1 | * | 1/2012 | Apacible | G06F 16/334 707/768 |
| 2012/0150835 A1 | * | 6/2012 | Bobick | G06F 40/247 707/706 |
| 2012/0185484 A1 | * | 7/2012 | Jones | G06Q 10/101 707/740 |
| 2012/0215773 A1 | * | 8/2012 | Si | G06Q 30/02 707/723 |

(Continued)

*Primary Examiner* — Robert W Beausoliel, Jr.
*Assistant Examiner* — Susan F Rayyan
(74) *Attorney, Agent, or Firm* — Ference & Associates LLC

(57) ABSTRACT

One embodiment provides a method, including: receiving, at an information handling device, a user query; identifying, using a processor, that a stored answer does not correspond to the user query; determining, using a processor, a query-answering source for the user query; transmitting the user query to the query-answering source; and providing an answer submitted by the query-answering source to a user. Other aspects are described and claimed.

15 Claims, 3 Drawing Sheets

(56) References Cited

U.S. PATENT DOCUMENTS

| | | | |
|---|---|---|---|
| 2013/0158984 A1* | 6/2013 | Myslinski | G06F 16/951 704/9 |
| 2013/0304758 A1* | 11/2013 | Gruber | G06F 16/248 707/769 |
| 2015/0006492 A1* | 1/2015 | Wexler | G06F 16/248 707/694 |
| 2015/0178392 A1* | 6/2015 | Jockisch | G06F 16/9535 707/706 |
| 2016/0180216 A1* | 6/2016 | Allen | G09B 7/02 706/46 |
| 2016/0292582 A1* | 10/2016 | Kozloski | G06Q 50/01 |
| 2016/0344828 A1* | 11/2016 | Hausler | H04L 67/42 |
| 2017/0004182 A1* | 1/2017 | Simpson | H04L 67/306 |
| 2017/0006032 A1* | 1/2017 | Simpson | H04W 4/21 |
| 2018/0077088 A1* | 3/2018 | Cabrera-Cordon | G06N 3/006 |
| 2018/0157721 A1* | 6/2018 | Khaitan | G06F 16/3325 |
| 2018/0307687 A1* | 10/2018 | Natkin | G06F 16/24578 |
| 2019/0286968 A1* | 9/2019 | Erpenbach | G06N 3/006 |
| 2020/0410427 A1* | 12/2020 | Haze | G06Q 10/063112 |
| 2021/0097097 A1* | 4/2021 | Alkan | G06F 16/3329 |

* cited by examiner

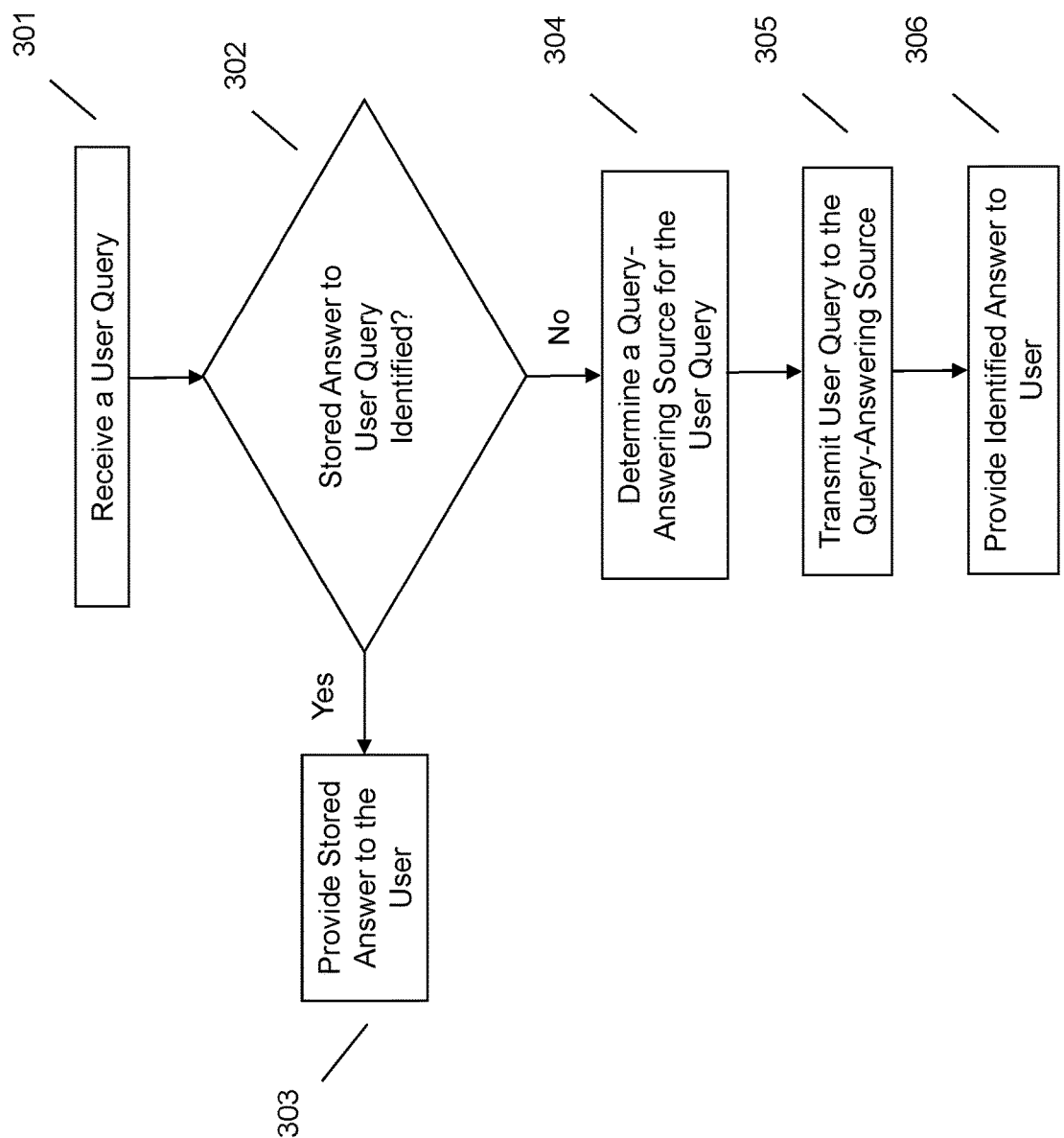

QUERY-ANSWERING SOURCE FOR A USER QUERY

BACKGROUND

Information handling devices ("devices"), for example smart phones, tablet devices, smart speakers, laptop and personal computers, and the like, may be capable of receiving, processing, and responding to user queries. For example, a user may interact with a digital assistant resident on a device via an input device (e.g., a voice input module, a gesture input module, a touch input module, etc.) to provide various types of user queries. Responsive to identifying a corresponding answer or function related to the user query, the digital assistant may output or perform the corresponding answer or function.

BRIEF SUMMARY

In summary, one aspect provides a method, comprising: receiving, at an information handling device, a user query; identifying, using a processor, that a stored answer does not correspond to the user query; determining, using a processor, a query-answering source for the user query; transmitting the user query to the query-answering source; and providing an answer submitted by the query-answering source to a user.

Another aspect provides an information handling device, comprising: a processor; a memory device that stores instructions executable by the processor to: receive a user query; identify that a stored answer does not correspond to the user query; determine a query-answering source for the user query; transmit the user query to the query-answering source; and provide an answer submitted by the query-answering source to a user.

A further aspect provides a product, comprising: a storage device that stores code, the code being executable by a processor and comprising: code that receives a user query; code that identifies that a stored answer does not correspond to the user query; code that determines a query-answering source for the user query; code that transmits the user query to the query-answering source; and code that provides an answer submitted by the query-answering source to a user.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3 illustrates an example method of providing an answer to a user query.

DETAILED DESCRIPTION

Figure 1:
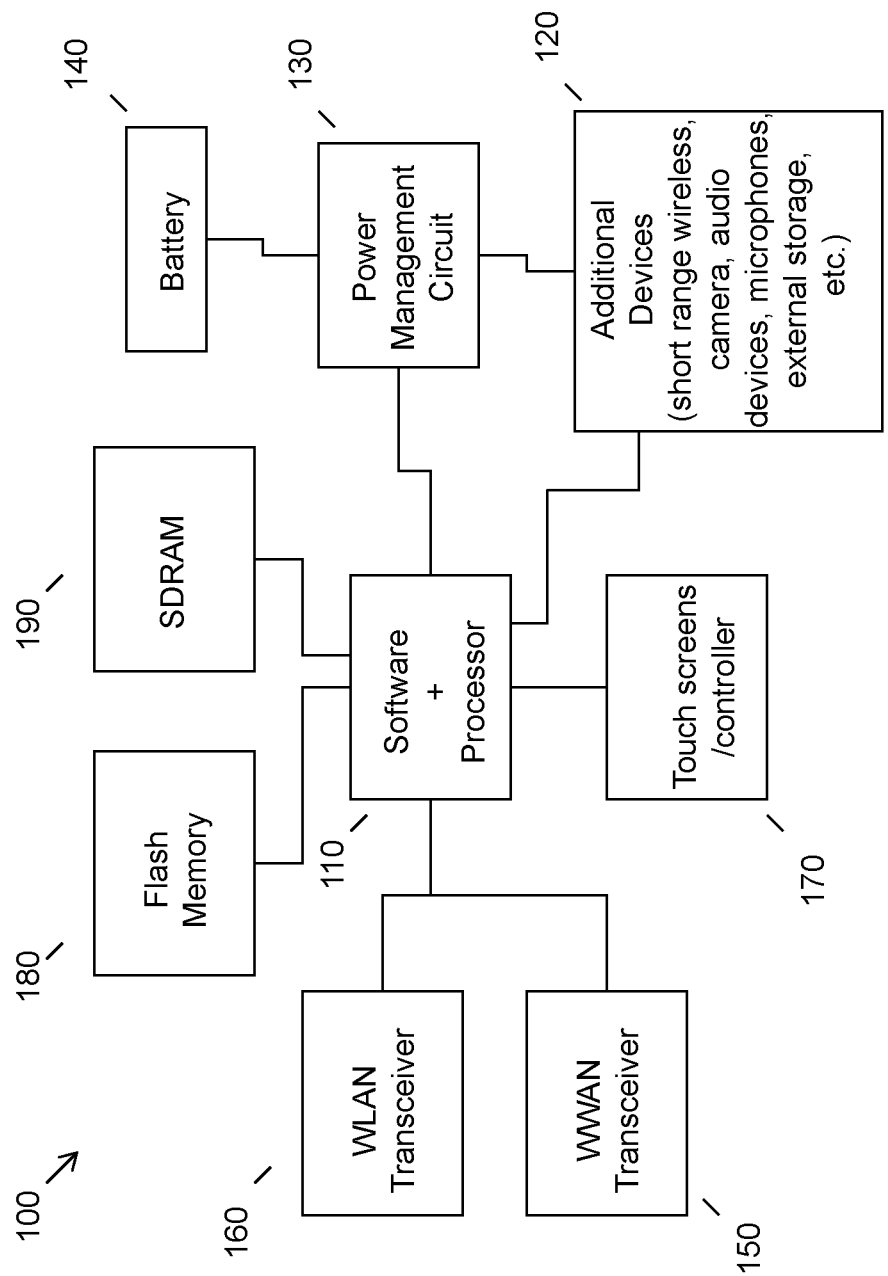
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Users frequently utilize devices to respond to a variety of different types of user-provided queries. One method of interacting with a device is to use digital assistant software employed on the device. Responsive to receiving a user query, a digital assistant may attempt to answer the query by first analyzing the content of the query and thereafter consulting one or more data sources to search for an answer. Although a digital assistant may be able to return an acceptable answer for many basic and direct questions (e.g., "what is the current temperature", "what is the fastest route from A to B", "what is 10 multiplied by 10", etc.) conventional digital assistant software has struggled to return acceptable answers for more subjective and/or nuanced questions (e.g., "what is your opinion regard X", "who were the best players in the game last night?", etc.).

When a digital assistant is unable to provide a satisfying response, a user generally either abandons their question or attempts to find the answer manually. For example, a user may conduct their own search by consulting articles and/or forums on the Internet. As another example, a user may seek out other individuals and pose their question to them. However, these alternatives may be time-consuming, burdensome, and may still not provide the user with the type of answer they are searching for.

Accordingly, an embodiment provides a method for providing an answer to a user query. In an embodiment, a user query may be received by a device. An embodiment may then identify that the user query may not be able to be answered by the device. For example, an embodiment may not understand the context of the query, may not know an answer to the query, or may recognize the query as a query intended to be directed to a wider audience. An embodiment may then determine and transmit the user query to an appropriate query-answering source. In an embodiment, the query-answering source may be at least one of an online forum or a willing contributor. The online forum may be a space where one or more other users may see the user query and provide suggested answers to that query. A willing contributor may be one or more other individuals that have expressed a willingness and/or agreed to receive user queries on their personal devices that they may provide answers to. Responsive to identifying an answer from the query-providing source, an embodiment may provide that answer to the user. Such a method may allow a user to receive an answer to their query when their device may not be able to provide an immediate answer.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes one or more touch screens 170 for data input and display/rendering. System 100 also typically includes various memory devices, for example flash memory 180 and SDRAM 190.

Figure 2:
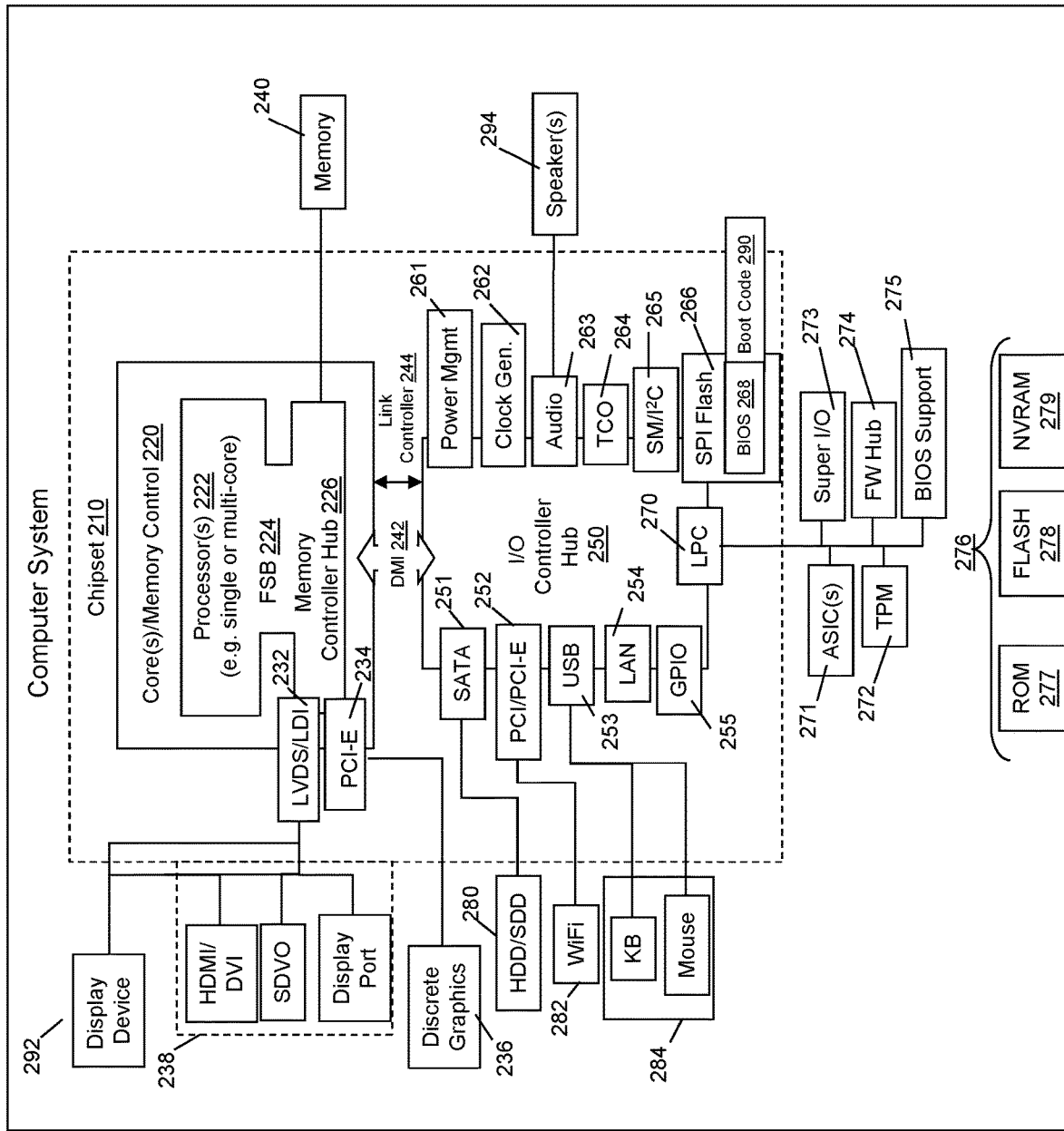
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, smart speakers, smart appliances, personal computer devices generally, and/or electronic devices that are capable of supporting a digital assistant that may receive and process user inputs. For example, the circuitry outlined in FIG. 1 may be implemented in a tablet or smart phone embodiment, whereas the circuitry outlined in FIG. 2 may be implemented in a laptop embodiment.

Referring now to FIG. 3, an embodiment may provide an answer to a user query by utilizing a query-answering source. At 301, an embodiment may receive a user query at a device. In an embodiment, the user query may be virtually any type of question that may be provided by virtually any type of input method recognizable by the device (e.g., touch input, voice input, keyboard input, etc.). The query may be detected by one or more input devices (e.g., touch-sensitive display screens, microphones, keyboards, etc.) operatively or integrally coupled to the device. In an embodiment, responsive to receiving the user query, an embodiment may parse the user query using one or more conventional word parsing techniques.

At 302, an embodiment may identify that a stored answer does not correspond to a user query. For example, in response to receiving a user query, an embodiment may access a database (e.g., stored locally on the device or remotely on another device or server, etc.) comprising a stored list of answers that correspond to specific questions. If an embodiment can identify an answer that corresponds to the user query, an embodiment may output that answer to the user. However, if an embodiment cannot identify an answer that corresponds to the user query, an embodiment may not output any answer from the list to the user. Other methods of identifying that a stored answer does not correspond to a user query may also be used. For example, an embodiment may be unable to even comprehend the query (e.g., if the query was provided using slang or other language a system is not familiar with, etc.). As another example, an embodiment may not identify a stored answer with enough confidence to output that answer to a user. In yet another example, an embodiment may also be trained to recognize specific queries or query types that are intended to be answered by broader audiences. For instance, certain questions may be more subjective in nature and may have a plurality of acceptable answers (e.g., "what is the best way to do X", "what is your opinion regarding Y", "what are the top five best comedy movies", etc.). An embodiment may be trained to identify these types of questions and perform downstream functions as further discussed herein.

Responsive to identifying, at 302, that a stored answer does not correspond to a user query, an embodiment may determine, at 304, a query-answering source for the user query and may transmit, at 305, the user query to the query-answering source. In the context of this application, a query-answering source may be one or more of an online forum where the user query may be posted and responded to by other individuals, one or more other individuals whose device the user query may be sent to (herein further referred to as "subscribed contributors" or "contributors"), other accessible data sources (e.g., information available on the interne, etc.), a combination thereof, and the like. In an embodiment, a notification may be provided to a user apprising them that a stored answer does not correspond to their query. An embodiment may thereafter automatically transmit the user query to a query-answering source or, alternatively, may ask the user if they would like their query transmitted to a query-answering source. An embodiment may also ask the user about which type of query-answering source they would like their query transmitted to or, alternatively, an embodiment may consult a stored designation identifying which type of query-answering source to transmit the query to. In an embodiment, prior to transmission of the user query, a user may choose a format for their query. For example, the user may choose to have their query presented as an open-ended question, as a question with a predetermined and designated number of answer choices individuals may select from, etc. A user may choose the format each time a query is transmitted or, alternatively, may designate a predetermined format for all query transmissions. In an embodiment, responsive to identifying, at 302, a stored answer, an embodiment may provide, at 303, the stored answer to the user. The foregoing query-answering sources will be further elaborated herein.

In the context of this application, an online forum may refer to a webpage having a forum application or message board that may be accessible by a plurality of individuals via the Internet. In an embodiment, the query may be sent to a singular forum or may be sent to a plurality of different forums. An embodiment may maintain/control one or more online forums that are dedicated to the receipt of user queries provided to devices. More particularly, these "dedicated" forums may only, or substantially only, comprise posted messages that are user queries that have been determined to not correspond to a stored answer. Alternatively, in another embodiment, the forums may be created and controlled by independent entities. In cases where these independent forums require subscriptions to post messages, an embodiment may require a user to subscribe to each forum queries are posted to.

In an embodiment, the query-answering source may be a forum that matches a topic associated with the query. In an embodiment, a user may explicitly designate a topic associated with their query. Conversely, an embodiment may intelligently determine a topic associated with the user query by first parsing the user query and thereafter analyzing the parsed words to determine a topic. After an embodiment has identified a topic of the user query, an embodiment may thereafter transmit that query to one or more forums having the same or similar topic. For example, a sports related user query (e.g., "who was the best player in the football game tonight?", etc.) may be directed to one or more forums dealing with sports (e.g., forums focused on football, forums focused on recent sporting events, etc.). In another embodiment, the query-answering source may be a forum associated with a brand of the information handling device. For example, each device brand may control and maintain one or more forums dedicated to receiving user queries from brand-associated devices.

In an embodiment, the query-answering source may be one or more subscribed contributors. In the context of this application, subscribed contributors may be one or more individuals who agree to have user queries delivered to them. In an embodiment, user queries may be delivered to the designated devices of the subscribed contributors via one or more conventional transmission techniques. In an embodiment, responsive to receiving a user query, the subscribed contributor's device may notify them that they have received a user query (e.g., via a visual notification, an audible notification, etc.). The subscribed contributor may then view the user query, provide a response, and transmit the response back to the user's device. In an embodiment, the subscribed contributor may identify (e.g., when agreeing to become a subscribed contributor, after being a subscribed contributor for a time, etc.) certain topics that they feel comfortable or qualified answering questions on. For example, a particular individual may believe that they have a vast knowledge of sports and movies so they subscribe to receive sports and movie related user queries. In an embodiment, the contributor may designate specific times of the day or week that they would be available to receive user queries. For example, a particular individual may not want to receive user query notifications on their device during conventional work hours (e.g., Monday-Friday from 9 a.m.-5 p.m., etc.) or late at night (e.g., after 10 p.m.). Such an embodiment allows a contributor to receive and answer user queries only during the times that they feel comfortable doing so. In an embodiment, certain user queries may only be sent to contributors located in a specific region. For instance, a user may designate their query as a local or regional query that is only transmitted to contributors located in the same locale or region as the user. Such an embodiment may be beneficial when a user query deals with a local or regional issue.

In an embodiment, the answers submitted by subscribed contributors may be rated by users. For example, each time a subscribed contributor provides an answer to a user query, the user may rate that contributor's answer (e.g., from a scale of 1 to 5, etc.). In an embodiment, a subscribed contributor may be assigned a rank based upon the rating of their answers. For example, contributors whose answers are frequently given high ratings may have a greater ranking than those contributors whose answers are not rated as high. In an embodiment, the ranking of the contributor may influence the frequency at which user queries are delivered to them. For example, high ranking contributors may receive user queries more frequently than low ranking contributors. In an embodiment, a user may be apprised of the ranking of the contributor answering their query (e.g., the contributor's ranking is presented to the user alongside their answer, etc.). In an embodiment, a user may subscribe to a service that only transmits their user queries to contributors with a ranking above a predetermined threshold. In such a system, the user may have greater confidence in the answers being provided to them by contributors. In situations where the users' subscription to such a service requires a monetary fee, the subscribed contributors may receive a portion of this fee.

An embodiment may further identify an urgency associated with the user query. In the context of this application, an urgency associated with the user query may refer to how urgently a user requires a response to that query (e.g., within minutes, within hours, within days, etc.). In an embodiment, the urgency may be identified explicitly by the user. For example, a user may ask a question and thereafter say "I need an answer to in 5 minutes". Alternatively, an embodiment may intelligently determine the urgency associated with the query. For example, a user may ask the question "I need to make dinner plans soon, what is a good steakhouse in the area?" An embodiment may parse the question and identify that the word "soon" indicates a heightened sense of urgency. Responsive to identifying the urgency, an embodiment may transmit the query to a query-answering source capable of responding to the query in a time frame designated by the urgency. For instance, with respect to forums, a plurality of online forums may exist that may each be dedicated to a particular urgency. For example, one forum may be dedicated to user queries that require a response within minutes, another may be dedicated to user queries that require a response within hours, another may be dedicated to user queries that require a response within days, etc. Each of these forums may still have topics under which the user queries may be sorted. With respect to subscribed contributors, an embodiment may notify the contributor of the urgency of the query. For example, an embodiment may notify a contributor (e.g., at the time when the query is sent to the contributor, etc.) that a user has requested an answer to a query within an hour. In an embodiment, certain contributors may designate themselves as being "on-call" to receive very urgent queries (e.g., queries that require demand an answer within minutes, etc.). An embodiment may then transmit very urgent queries to these on-call contributors who are thereafter expected to respond to these queries within the designated timeframe.

At 306, an embodiment may identify an answer from the query-answering source and provide that answer back to the user. An embodiment may provide the answer to the user using one or more output techniques (e.g., via audible output using one or more speakers, visual output on a display screen, a combination thereof, etc.). An embodiment may identify an answer using one or more answer-identifying methods. For instance, an embodiment may identify an answer by identifying the most common answer posted to a forum and/or submitted by subscribed contributors. Another embodiment may identify an answer by identifying which answer was the highest voted. For example, a particular answer may have received the most "up-votes" on a forum so it is the one provided to the user. Another embodiment may identify an answer by identifying the answer with the most confidence associated with it. For example, an embodiment may identify that a low ranking contributor and a high ranking contributor provided different answers to a user query. An embodiment may choose the answer provided by the high-ranking contributor as the one to provide to the user due to the confidence the embodiment has in the user's high ranking. In situations where there is only one answer, an embodiment may simply provide that sole answer back to the user and may include an indication that it was the only answer received. In an embodiment, an identified answer may be a plurality of answers. For example, a user may be presented with some or all of the answers posted to a forum and/or provided to the user from subscribed contributors.

The various embodiments described herein thus represent a technical improvement to conventional query answering techniques. Using the techniques described herein, an embodiment may receive a user query and identify whether a stored answer corresponds to the user query. Responsive to identifying that a stored answer does not correspond to the user query, an embodiment may determine a query-answering source (e.g., an online forum, a subscribed contributor, etc.) to transmit the user query to. After receiving and/or identifying one or more answers from the query-answering source, an embodiment may provide the answer back to the user. Such a method may enable users to receive answers to queries that a device may not be capable of answering.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., nearfield communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving, at an information handling device, a user query from a user;
identifying, using a processor, that a stored answer does not correspond to the user query;
determining, using a processor and based on an identified urgency associated with the user query, a query-answering source for the user query, wherein the query-answering source corresponds to a plurality of contributors identified as being fast responders during a predetermined time period in which the user query was received;
transmitting the user query to other devices associated with the plurality of contributors;
receiving, from at least a subset of the plurality of contributors, a set of answers to the user query; and
providing a single answer to the user from the set, wherein the single answer is derived from a highest-ranked contributor from the subset of the plurality of contributors.

2. The method of claim 1, further comprising ranking the at least one subscribed contributor and assigning a confidence to the answer provided by the at least one contributor based on the ranking.

3. The method of claim 1, wherein the answer is at least one answer selected from the group consisting of a most common answer, a most confident answer, and a highest voted answer.

4. The method of claim 1, wherein the answer comprises a plurality of answers and wherein the providing comprises providing each of the plurality of answers to the user.

5. The method of claim 1, wherein the providing comprises identifying an available answer after a predetermined time where no available answer has been identified.

6. The method of claim 1, further comprising identifying an urgency associated with the user query and providing an indication of the urgency to the at least one contributor.

7. An information handling device, comprising:
a processor;
a memory device that stores instructions executable by the processor to:
receive a user query;
identify that a stored answer does not correspond to the user query from a user;
determine, based on an identified urgency associated with the user query, a query-answering source for the user query, wherein the query-answering source corresponds to a plurality of contributors identified as being fast responders during a predetermined time period in which the user query was received;
transmit the user query to other devices associated with the plurality of contributors;
receive, from at least a subset of the plurality of contributors, a set of answers to the user query; and
provide a single answer to the user from the set, wherein the single answer is derived from a highest-ranked contributor from the subset of the plurality of contributors.

8. The information handling device of claim 7, wherein the instructions executable by the processor to transmit comprise instructions executable by the processor to transmit the user query to another device associated with the at least one contributor.

9. The information handling device of claim 7, wherein the instructions are further executable by the processor to identify an urgency associated with the user query.

10. The information handling device of claim 7, wherein the answer is at least one answer selected from the group consisting of a submitted answer, a most common answer, a most confident answer, and a highest voted answer.

11. The information handling device of claim 7, wherein the answer comprise a plurality of answers and wherein the instructions executable by the processor to provide comprise instructions executable by the processor to provide each of the plurality of answers to the user.

12. The information handling device of claim 7, wherein the instructions executable by the processor to provide comprise instructions executable by the processor to identify an available answer after a predetermined time where no available answer has been identified.

13. The information handling device of claim 7, wherein the instructions are further executable by the processor to identify an urgency associated with the user query and provide an indication of the urgency to the at least one contributor.

14. A product, comprising:
a storage device that stores code, the code being executable by a processor and comprising:
code that receives a user query from a user;
code that identifies that a stored answer does not correspond to the user query;

code that determines, based on an identified urgency associated with the user query, a query-answering source for the user query, wherein the query-answering source corresponds to a plurality of contributors identified as being fast responders during a predetermined time period in which the user query was received;

code that transmits the user query to other devices associated with the plurality of contributors;

code that receives, from at least a subset of the plurality of contributors, a set of answers to the user query; and code that provides a single answer to the user from the set, wherein the single answer is derived from a highest-ranked contributor from the subset of the plurality of contributors.

15. The product of claim 14, wherein the code that provides comprises code that identifies an available answer after a predetermined time where no available answer has been identified.

* * * * *